United States Patent
Murakami et al.

(10) Patent No.: US 11,613,612 B2
(45) Date of Patent: Mar. 28, 2023

(54) FLUORORUBBER COMPOSITION, METHOD FOR PRODUCING THE SAME AND FLUORORUBBER CROSSLINKED MOLDED ARTICLE

(71) Applicant: NOK CORPORATION, Tokyo (JP)

(72) Inventors: Hideyuki Murakami, Kanagawa (JP); Shunsuke Abe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 602 days.

(21) Appl. No.: 16/623,909

(22) PCT Filed: Jun. 28, 2018

(86) PCT No.: PCT/JP2018/024695
§ 371 (c)(1),
(2) Date: Dec. 18, 2019

(87) PCT Pub. No.: WO2019/009188
PCT Pub. Date: Jan. 10, 2019

(65) Prior Publication Data
US 2021/0147639 A1  May 20, 2021

(30) Foreign Application Priority Data
Jul. 5, 2017 (JP) .............................. JP2017-131927

(51) Int. Cl.
| | | |
|---|---|---|
| C08J 3/22 | (2006.01) | |
| C08J 3/00 | (2006.01) | |
| C08L 27/16 | (2006.01) | |
| C08L 27/18 | (2006.01) | |
| C08L 27/20 | (2006.01) | |
| C08K 3/04 | (2006.01) | |
| C08K 5/14 | (2006.01) | |
| C08K 7/04 | (2006.01) | |
| F16J 15/3284 | (2016.01) | |

(52) U.S. Cl.
CPC ............... *C08J 3/22* (2013.01); *C08J 3/005* (2013.01); *C08L 27/16* (2013.01); *C08L 27/18* (2013.01); *C08L 27/20* (2013.01); *F16J 15/3284* (2013.01); *C08K 3/041* (2017.05); *C08K 5/14* (2013.01); *C08K 7/04* (2013.01); *C08K 2201/011* (2013.01); *C08L 2310/00* (2013.01)

(58) Field of Classification Search
CPC .......... C08J 3/005; C08J 3/22; C08J 2427/16; C08J 2327/16; C08K 3/04; C08K 2201/011; C08L 27/16; C08L 27/18; C08L 27/20
USPC .............. 252/500, 502, 510, 511; 525/326.3
See application file for complete search history.

(56) References Cited

U.S. PATENT DOCUMENTS

| | | | |
|---|---|---|---|
| 2008/0152896 A1 | 6/2008 | Moorlag et al. | |
| 2010/0160503 A1* | 6/2010 | Nakagawa | C08J 5/005 977/773 |
| 2011/0014466 A1 | 1/2011 | Hu et al. | |
| 2012/0163888 A1 | 6/2012 | Zhang et al. | |
| 2012/0213563 A1 | 8/2012 | Qi et al. | |
| 2014/0319429 A1* | 10/2014 | Nicolas | B29C 48/405 252/511 |
| 2017/0369660 A1 | 12/2017 | Ata et al. | |
| 2018/0362734 A1 | 12/2018 | Takeyama | |

FOREIGN PATENT DOCUMENTS

| | | | |
|---|---|---|---|
| CN | 106432991 A1 | 2/2017 | |
| CN | 106633544 A | 5/2017 | |
| JP | 2008-155210 A | 7/2008 | |
| JP | 2012-136698 A | 7/2012 | |
| JP | 5670817 | 11/2012 | |
| JP | 2013-83340 | 5/2013 | |
| JP | 2013-122883 A | 6/2013 | |
| JP | 2014-081073 A | 5/2014 | |
| JP | 2014081073 A * | 5/2014 | ............... F16J 15/10 |
| JP | 2017-008244 A | 1/2017 | |
| JP | 2017-014314 A | 1/2017 | |
| WO | WO 2016/133207 A1 | 8/2016 | |
| WO | WO 2016/208203 A1 | 12/2016 | |

OTHER PUBLICATIONS

Lee "Mechanical and Electrical Properties of Multi-walled Carbon Nanotube/FKM Composites." Source: http://pubsapp.acs.org/cgi-bin/preprints/display?meet=242&page=86957_11885.pdf&div=pmse& (Year: 2011).*
Chiu "Poly(vinylidene fluoride)/polycarbonate blend-based nanocomposites with enhanced rigidity d Selective localization of carbon nanofillers and organoclay," Polymer Testing 62 (2017) 115-123 (Year: 2017).*
International Search Report from corresponding PCT application No. PCT/JP2018/024695 dated Sep. 26, 2018 (4 pgs).
Notification of Transmittal of Copies of the International Preliminary Report on Patentability of corresponding application No. PCT/JP2018/024695.
International Preliminary Report on Patentability of Corresponding application No. PCT/JP2018/024695.

* cited by examiner

*Primary Examiner* — Tri V Nguyen

(57) ABSTRACT

A fluororubber composition that is a kneaded mixture of a carbon nanotube masterbatch comprising 4 to 20 parts by weight of multilayer carbon nanotubes, which are fibrous carbon nanostructures that do not contain monolayer carbon nanotubes, based on 100 parts by weight of a fluororubber polymer, and a fluororubber raw material comprising at least a fluororubber polymer and a reinforcing filler, in which the multilayer carbon nanotubes are compounded in an amount of 0.5 to 6 wt. % in the kneaded mixture. The kneading is performed using a roll or a kneader when the fluororubber composition is produced. The fluororubber composition can provide a fluororubber crosslinked molded article that exhibits abrasion resistance and blister resistance.

7 Claims, No Drawings

FLUORORUBBER COMPOSITION, METHOD FOR PRODUCING THE SAME AND FLUORORUBBER CROSSLINKED MOLDED ARTICLE

RELATED APPLICATION

This application is a 35 U.S.C. § 371 national phase filing of International Patent Application No. PCT/JP2018/024695, filed Jun. 28, 2018, which claims priority under 35 U.S.C. § 119 to Japanese Patent Application No. 2017-131927, filed Jul. 5, 2017, the entire disclosure of which is hereby expressly incorporated by reference.

TECHNICAL FIELD

The present invention relates to a fluororubber composition, a method for producing the same and a fluororubber crosslinked molded article. More specifically, the present invention relates to a fluororubber composition that can provide a fluororubber crosslinked molded article that exhibits abrasion resistance and blister resistance, a method for producing the same, and a fluororubber crosslinked molded article.

BACKGROUND ART

Fluororubber compositions have excellent oil resistance and fuel resistance, and are used as sealing materials, such as oil seals, O rings, and packings, in a wide range of fields, such as automotive and industrial machinery. Along with the recent expansion of use applications, the use of fluororubber compositions in specific high load environments may cause the occurrence of blisters in the vicinity of the seal, and the occurrence of abnormal abrasion on the sliding surface.

Fillers with high reinforcing properties are desired in terms of the required function of sealing products; however, there were problems that sufficient reinforcing properties could not be obtained by compounding conventional fillers, and that excellent sealing properties (product function) could not be obtained.

A technique of producing dynamic seals and static seals for oil field devices using a carbon fiber composite material obtained by blending a first composite elastomer prepared by compounding carbon nanotubes with natural rubber etc., and a second composite elastomer prepared by compounding carbon black with natural rubber etc. is disclosed (Patent Document 1).

Patent Document 1 clearly indicates that 60 parts by mass or more and 100 parts by mass or less of carbon nanotubes are compounded based on 100 parts by mass of the first elastomer. Accordingly, the amount of the carbon nanotubes compounded in the first composite elastomer is 37.5 mass % or more. When the first elastomer is assumed to be a fluororubber polymer, if the amount of the carbon nanotubes exceeds 20 parts by mass based on 100 parts by mass of the fluororubber polymer, there are problems that roll kneading properties are inferior, the rubber compound surface becomes rough, which is not normal rubber surface. Since no experiments were conducted for fluororubber polymers in Patent Document 1, these serious problems have not been noticed.

Further, Patent Document 1 discloses that when carbon nanotubes are compounded with natural rubber, the values of tensile strength and breaking elongation increase. However, it is unclear whether the values of tensile strength and breaking elongation increase when carbon nanotubes are compounded with the exemplified fluororubber.

Moreover, Patent Document 2 discloses a technique of obtaining an effect of blister resistance by compounding carbon nanotubes with an elastomer, such as hydrogenated nitrile rubber or fluororubber. However, Patent Document 2 indicates that in Comparative Example 3, which uses hydrogenated nitrile rubber, an effect of "blister resistance" is not obtained when multilayer fibrous carbon nanostructures that do not contain monolayer carbon nanotubes are used as the carbon nanotubes.

PRIOR ART DOCUMENT

Patent Document

Patent Document 1: JP-B-5670817
Patent Document 2: WO 2016/208203 A1

OUTLINE OF THE INVENTION

Problem to be Solved by the Invention

An object of the present invention is to provide a fluororubber composition that can yield a fluororubber crosslinked molded article that exhibits abrasion resistance and blister resistance, a method for producing the same, and a fluororubber crosslinked molded article.

Means for Solving the Problem

The first object of the present invention can be achieved by a fluororubber composition that is a kneaded mixture of a carbon nanotube masterbatch comprising 4 to 20 parts by weight of multilayer carbon nanotubes, which are fibrous carbon nanostructures that do not contain monolayer carbon nanotubes, based on 100 parts by weight of a fluororubber polymer, and a fluororubber raw material comprising at least a fluororubber polymer and a reinforcing filler, in which the multilayer carbon nanotubes are compounded in an amount of 0.5 to 6 wt. % in the kneaded mixture.

The second object of the present invention can be achieved by a method for producing the fluororubber composition, wherein kneading is performed using a roll or a kneader when the fluororubber composition is produced.

Moreover, the third object of the present invention can be achieved by a fluororubber crosslinked molded article obtained by crosslinking and molding the fluororubber composition.

Effect of the Invention

The fluororubber composition according to the present invention has excellent effect that it can provide a fluororubber crosslinked molded article that exhibits abrasion resistance and blister resistance.

The obtained fluororubber crosslinked molded article is effectively used as a shaft sealing material or the like.

The carbon nanotube masterbatch used as a component of the fluororubber molded article of the present invention has excellent kneading properties. Moreover, when multilayer carbon nanotubes, which are fibrous carbon nanostructures that do not contain monolayer carbon nanotubes, are used as the carbon nanotubes, a fluororubber crosslinked molded article having excellent blister resistance can also be provided.

EMBODIMENTS FOR CARRYING OUT THE INVENTION

1. Carbon Nanotube Masterbatch

The carbon nanotube masterbatch used in the present invention is obtained by compounding 4 to 20 parts by weight of multilayer carbon nanotubes based on 100 parts by weight of a fluororubber polymer, and kneading the resulting mixture.

<Carbon Nanotubes>

The carbon nanotubes used in the present invention are multilayer carbon nanotubes formed by rolling carbon hexagonal network planes (graphene sheet planes) of graphite into a cylindrical shape.

As the multilayer carbon nanotubes used in the present invention, fibrous carbon nanostructures that do not contain monolayer carbon nanotubes are used. Among carbon nanotubes, multilayer carbon nanotubes are such that cylinders of a carbon six-membered ring network are multiple multilayered. For example, multilayer carbon nanotubes obtained by spirally rolling graphene sheets may be used.

The multilayer carbon nanotubes preferably have an average diameter of about 0.5 to 250 nm. The average diameter can be measured by observation with an electron microscope. Moreover, the specific surface area of the multilayer carbon nanotubes is preferably about 250 to 300 $m^2/g$. As a commercial product of the multilayer carbon nanotubes used in the present invention, for example, "NC7000" produced by Nanocyl (Belgium) can be used.

The fluororubber polymer compounded with the carbon nanotube masterbatch is preferably a polyol-crosslinkable fluororubber polymer or a peroxide-crosslinkable fluororubber polymer. Further, a polyol-crosslinkable fluororubber polymer and a peroxide-crosslinkable fluororubber polymer can also be used in combination.

<Polyol-Crosslinkable Fluororubber Polymer>

As the polyol-crosslinkable fluororubber polymer, a homopolymer or copolymer of one or two or more fluorine-containing olefins can be used.

Examples of the fluorine-containing olefins include vinylidene fluoride, hexafluoropropylene, pentafluoropropylene, trifluoroethylene, trifluorochloroethylene, tetrafluoroethylene, vinyl fluoride, perfluoroacrylic acid ester, perfluoroalkyl acrylate, perfluoro methyl vinyl ether, perfluoro propyl vinyl ether, and the like. These fluorine-containing olefins can be used singly or in combination of two or more.

Preferable examples of the polyol-crosslinkable fluororubber polymer used in the present invention include vinylidene fluoride-hexafluoropropylene copolymers, vinylidene fluoride-tetrafluoroethylene-hexafluoropropylene terpolymers, and the like. These polymers are obtained by solution polymerization, suspension polymerization, or emulsion polymerization, and are commercially available (e.g., "Viton A-500" and "Viton B-600", produced by DuPont).

<Peroxide-Crosslinkable Fluororubber Polymer>

As the peroxide-crosslinkable fluororubber polymer, a fluorine-containing olefin terpolymer of peroxide-crosslinkable type can be used. Examples of fluorine-containing olefins include the compounds mentioned as examples of the polyol-crosslinkable fluororubber polymer.

In the present invention, the peroxide-crosslinkable fluororubber polymer is preferably, for example, fluororubber, which is a peroxide-crosslinkable vinylidene fluoride-hexafluoropropylene-perfluoro alkyl vinyl ether terpolymer, and the like. These polymers can be obtained by solution polymerization, suspension polymerization, or emulsion polymerization, and are commercially available (e.g., "GBL-600S", and "GLT-600S" produced by DuPont, and "DAIEL-G801" produced by Daikin Industries, Ltd.).

<Compounding Ratio of Carbon Nanotubes and Fluororubber Polymer>

The carbon nanotube masterbatch is obtained by compounding 4 to 20 parts by weight of multilayer carbon nanotubes based on 100 parts by weight of a fluororubber polymer, and kneading the resulting mixture. If the amount of the carbon nanotubes is less than 4 parts by weight, the reinforcement performance of the multilayer carbon nanotubes cannot be exhibited. If the amount of the carbon nanotubes is greater than 20 parts by weight, kneading properties are inferior.

<Kneading>

Although the kneading method is not particularly limited, kneading can be performed using a roll kneading equipment or a kneader kneading equipment. When a roll kneading equipment is used as the kneading method, an open roll can be preferably used. The open roll is composed of a pair of two rolls, which are preferably arranged at about 0.7 to 1.5 mm roll interval.

Regarding a carbon nanotube masterbatch obtained by this kneading process, when fluororubber is masticated, fluororubber molecular chains are moderately cut to generate free radicals. The free radicals generated by mastication are likely to be combined with multilayer carbon nanotubes.

2. Method for Producing Fluororubber Kneaded Mixture

<First Kneading Process>

In the first kneading process, 4 to 20 parts by weight of multilayer carbon nanotubes are compounded based on 100 parts by weight of a fluororubber polymer, and the resulting mixture is kneaded using an open roll or a kneader to produce a carbon nanotube masterbatch.

Although the kneading method is not particularly limited, kneading can be performed using a roll kneading equipment or a kneader kneading equipment. When a roll kneading equipment is used as the kneading method, an open roll can be preferably used. The open roll is composed of a pair of two rolls, which are preferably arranged at about 0.7 to 1.5 mm roll interval.

The temperature of the fluororubber polymer in this kneading process is, for example, about 60 to 100° C., preferably about 80 to 100° C., when using a roll kneading equipment, and is, for example, about 100 to 220° C., preferably about 150 to 200° C., when using a kneader kneading equipment.

<Second Kneading Process>

Subsequently, in the second kneading process, the carbon nanotube masterbatch is compounded with a fluororubber raw material comprising at least a fluororubber polymer and a reinforcing filler so that the amount of the multilayer carbon nanotubes is 0.5 to 6 wt. % in the kneaded mixture, and the resulting mixture is kneaded to prepare a fluororubber composition. The fluororubber polymer may be the same as or different from the fluororubber polymer used in the first kneading process.

The fluororubber polymer is preferably selected from a polyol-crosslinkable fluororubber polymer or a peroxide-crosslinkable fluororubber polymer. The polyol-crosslinkable fluororubber polymer or the peroxide-crosslinkable fluororubber polymer may be the same as or different from the polyol-crosslinkable fluororubber polymer or peroxide-crosslinkable fluororubber polymer used in the first kneading process.

In a preferable embodiment of the present invention, kneading is performed in two steps as first kneading and second kneading, followed by crosslinking, thereby producing a crosslinked fluororubber. In the first kneading, a carbon nanotube masterbatch containing a fluororubber polymer is produced by roll kneading or kneader kneading. The masterbatch is introduced into a second kneading equipment, which is a roll kneading equipment. In the second kneading equipment, the masterbatch and the fluororubber raw material are compounded by kneading to produce a fluororubber composition.

When the masterbatch and the fluororubber raw material are kneaded in the second kneading equipment, the kneading method is not particularly limited; however, kneading can be performed using a kneader kneading equipment and/or a roll kneading equipment. Specifically, the following embodiments can be exemplified.

In one embodiment of the second kneading process, a case, wherein a kneader kneading equipment is used, can be exemplified. In this case, the masterbatch and the fluororubber raw material may be simultaneously supplied and kneaded; alternatively, the fluororubber raw material may be previously kneaded with a kneader, and the masterbatch may be supplied thereto.

In another embodiment of the second kneading process, a case, wherein a roll kneading equipment is used, can be exemplified. In this case, a roll kneading equipment having a pair of two rolls is used. The masterbatch is wound around a first roll of the roll kneading equipment, and the fluororubber raw material is supplied thereto. Thus, the fluororubber composition can be produced.

Moreover, in another embodiment of the second kneading process, a kneader kneading equipment and a roll kneading equipment can be used in combination. In this embodiment, the fluororubber raw material is previously kneaded with a kneader to produce a rubber compound. Thereafter, the rubber compound is wound around the roll, and the masterbatch is supplied thereto. Thus, the sufficiently kneaded fluororubber composition is produced.

As the reinforcing filler contained in the fluororubber raw material, at least one of wollastonite, carbon black, silica, clay, talc, etc., can be selected and used. The reinforcing filler is used at a ratio of about 3 to 50 parts by weight, preferably about 10 to 30 parts by weight, based on 100 parts by weight of the fluororubber polymer used in the second kneading process.

Examples of compounding agents, other than the reinforcing filler, contained in the fluororubber raw material include fillers other than the above fillers, such as calcium carbonate, magnesium carbonate, aluminum hydroxide, magnesium hydroxide, aluminum silicate, magnesium silicate, calcium silicate, potassium titanate, titanium oxide, barium sulfate, aluminum borate, glass fibers, aramid fibers, and diatomite; processing aids, such as wax, metal soap, and carnauba wax; acid acceptors, such as calcium hydroxide, magnesium oxide, zinc oxide, and hydrotalcite; antiaging agents; thermoplastic resins; and the like. Among them, magnesium oxide is preferable, in terms of obtaining the low repulsive elastic modulus, low friction coefficient, and low adhesion of the crosslinked fluororubber.

In the second kneading process of the present invention, kneading is performed in the following manner using a kneading equipment, such as a roll or a kneader.

When a roll is used as the kneading equipment, the carbon nanotube masterbatch obtained in the first kneading process (equipment) is wound around a first roll of a second kneading equipment having a pair of two rolls. A fluororubber raw material comprising at least a fluororubber polymer and a reinforcing filler is supplied to the bulk of the kneaded material conditioned as wound around the first roll.

Subsequently, kneading is performed between the first roll and the second roll. The temperature of the fluororubber polymer in this roll kneading process is, for example, about 60 to 100° C., preferably about 80 to 100° C. Thus, when the carbon nanotube-containing fluororubber polymer and the fluororubber raw material are kneaded at a relatively high temperature, the fluororubber polymer can easily enter the gaps between the carbon nanotubes.

Further, the roll interval between the first roll and the second roll is preferably arranged in the range of about 0.7 to 1.5 mm. In the kneading process, the mixture can be supplied to an open roll, and milled with tight nip once to several times (e.g., about once to 10 times). By milling with tight nip, a high shear force acts on the fluororubber polymer, and the aggregated carbon nanotubes are well dispersed in the fluororubber polymer.

The step of dispersing the carbon nanotubes in the fluororubber by the shear force is not limited to an open roll method. Although a closed kneading method or a multiaxial extruding kneading method can also be used, an open roll method is particularly preferable. When kneading and mixing are performed using a kneader, the temperature is about 100 to 200° C., preferably about 140 to 180° C.

<Crosslinking Process>

In the second kneading process, before or during mixing of the fluororubber raw material and the carbon nanotube masterbatch, or after milling with tight nip, the sheeted composite material can be mixed with a crosslinking agent, and crosslinking and molding can be performed to produce a fluororubber crosslinked molded article.

As a polyol-based crosslinking agent used for the polyol-crosslinkable fluororubber polymer, bisphenols are preferably.

Specific examples of bisphenol, include polyhydroxy aromatic compound such as 2,2-bis(4-hydroxyphenyl)propane [bisphenol A], 2,2-bis(4-hydroxyphenyl)perfluoropropane [bisphenol AF], bis(4-hydroxyphenyl) sulfone [bisphenol S], bisphenol A.bis(diphenyl phosphate), 4,4'-dihydroxydiphenyl, 4,4'-dihydroxydiphenylmethane, 2,2-bis(4-hydroxyphenyl)butane, and the like. Bisphenol A, bisphenol AF, and the like are preferably used. These may be in the form of alkali metal salts or alkaline earth metal salts. The content of the polyol-based crosslinking agent is preferably within the range of about 0.4 to 20 parts by weight based on 100 parts by weight of the fluororubber polymer.

Further, a commercially available masterbatch containing a raw material rubber and a crosslinking agent may be used as the polyol-based crosslinking agent. These crosslinking agents may be used singly or in combination of two or more.

A crosslinking accelerator can be used in the production of a crosslinked fluororubber. As the crosslinking accelerator, for example, a quaternary phosphonium salt can be used.

Specific examples of the quaternary phosphonium salt include tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, tetraoctylphosphonium chloride, cetyldimethylbenzylphosphonium chloride, etc. The content of the polyol-based crosslinking accelerator is preferably within the range of about 0.3 to 20 parts by weight based on 100 parts by weight of the fluororubber polymer.

As the crosslinking accelerator, a commercially available masterbatch containing a raw material rubber and a crosslinking accelerator may be used. Further, these crosslinking agents may be used singly or in combination of two or more.

As the crosslinking accelerator, a quaternary ammonium salt can be used singly or in combination with a quaternary phosphonium salt mentioned above. Examples of the quaternary ammonium salt include 5-benzyl-1,5-diazabicyclo[4.3.0]-5-nonenium tetrafluoroborate or 5-benzyl-1,5-diazabicyclo[4.3.0]-5-nonenium hexafluorophosphate, etc.

Tetrafluoroborate or hexafluorophosphate has a melting point of about 80° C. or 100° C., respectively, and is easily melted during heat kneading (about 100° C.) using a roll, a kneader, a Banbury mixer, or the like. Thus, they have excellent dispersibility.

A commercially available masterbatch containing a raw material rubber and quaternary ammonium salt may be used as the quaternary ammonium salt. Further, these crosslinking accelerator, may be used singly or in combination of two or more.

Examples of the organic peroxide-based crosslinking agent corresponding to peroxide-crosslinkable fluororubber polymer include 2,5-dimethylhexane-2,5-dihydro peroxide, 2,5-dimethyl-2,5-di(benzoylperoxy)hexane, tert-butyl peroxide, dicumyl peroxide, tert-butyl cumyl peroxide, 1,1-di(tert-butylperoxy)-3,3,5-trimethylcyclohexane, 2,5-dimethyl-2,5-di(tert-butylperoxy)hexane, 2,5-dimethyl-2,5-di(tert-butylperoxy)hexyne-3, 1,3-di(tert-butylperoxyisopropyl)benzene, tert-butyl peroxybenzoate, tert-butylperoxy isopropylcarbonate, n-butyl-4,4-di(tert-butylperoxy)valerate, and the like. Commercially available products (such as Perhexa 25B-40, produced by NOF Corporation) can be used directly as such. The content of the organic peroxide-based crosslinking agent is preferably within the range of about 0.3 to 5 parts by weight based on 100 parts by weight of the fluororubber polymer.

Further, as the peroxide cross-linking agent, a commercially available masterbatch containing a raw material rubber and a crosslinking agent may be used. These crosslinking agents may be used singly or in combination of two or more.

As the crosslinking accelerator (aid) that can be used in the peroxide-based crosslinking system, triallyl isocyanurate or the like is used. Other examples include metal oxides typified by zinc oxide, fatty acids typified by stearic acid, and triethanolamine, diethylene glycol, etc., when a silica-based reinforcing agent is compounded. The content of the crosslinking accelerator is preferably within the range of about 0.1 to 10 parts by weight based on 100 parts by weight of the fluororubber polymer.

Subsequently, the fluororubber composition, which is a kneaded mixture produced by kneading in the second kneading process described above, is crosslinked to produce a crosslinked fluororubber. That is, the fluororubber composition produced as described above is, for example, pressurized and heat-vulcanized to produce a crosslinked molded article.

Specifically, the fluororubber composition produced as described above can be heated (primary vulcanization) generally at a temperature of about 140 to 230° C. for about 1 to 120 minutes using an injection molding machine, a compression molding machine, a vulcanizing press machine, an oven, or the like, thereby obtaining a fluororubber crosslinked molded article.

The primary vulcanization is a step to perform crosslinking to such an extent that a shape can be maintained, in order to form a constant shape (preforming). A complicated shape is preferably molded using a mold, and the primary vulcanization is also possible in an oven, such as air heating.

In the present invention, a secondary vulcanization can also be performed, if necessary. When the secondary vulcanization is performed, a general method may be used; however, it is preferable, for example, to perform heat treatment at a temperature of about 200 to 300° C. for about 1 to 20 hours.

3. Shaft Sealing Material

Shaft sealing materials, such as rotation sliding seals, can be produced using the obtained crosslinked fluororubber. Shaft sealing materials can be widely used as a sealing material between a shaft and a housing in the field of automotive, industrial machinery, etc.

EXAMPLES

The following describes the present invention based on Examples; however, the present invention is not limited by these Examples.

Test 1

In Test 1 of this Example, kneading was performed in two steps as a first kneading and a second kneading, followed by crosslinking, thereby producing a crosslinked fluororubber. In the first kneading, a carbon nanotube masterbatch containing a fluororubber polymer was produced by roll kneading or kneader kneading. The masterbatch was introduced into a second kneading equipment of a roll kneading equipment. In the second kneading equipment, the masterbatch and a fluororubber raw material were kneaded to produce a fluororubber composition. When the masterbatch and the fluororubber raw material were kneaded using rolls as the second kneading equipment, the fluororubber raw material was previously kneaded with a kneader to produce a rubber compound. The previously produced rubber compound was wound around the roll of the second kneading equipment, and the masterbatch described above was supplied thereto, thereby producing a sufficiently kneaded fluororubber composition.

Table 1 below shows the compounding formulations of the carbon nanotube masterbatches.

Fluororubber polymer [FKM] Viton A-500 is produced by DuPont and is polyol-crosslinkable. Moreover, carbon nanotube [CNT] NC7000 is produced by Nanocyl.

TABLE 1

| (First Kneading Process) | | | | | | | | | |
|---|---|---|---|---|---|---|---|---|---|
| | | | Masterbatch compounding No. | | | | | | |
| | | | 1 Ex. | 2 Ex. | 3 Ex. | 4 Ex. | 5 Ex. | 6 Comp. Ex. | 7 Comp. Ex. |
| Compounding (wt. %) | FKM | Viton A-500 | 95 | 90 | 90 | 80 | 80 | 79 | 79 |

TABLE 1-continued (First Kneading Process)

| | | 1 Ex. | 2 Ex. | 3 Ex. | 4 Ex. | 5 Ex. | 6 Comp. Ex. | 7 Comp. Ex. |
|---|---|---|---|---|---|---|---|---|
| CNT | NC7000 (wt. %) | 5 | 10 | 10 | 20 | 20 | 21 | 21 |
| | Sum total (wt. %) | 100 | 100 | 100 | 100 | 100 | 100 | 100 |
| | CNT content in the masterbatch (wt. %) | 5 | 10 | 10 | 20 | 20 | 21 | 21 |
| | Kneading equipment | roll | roll | kneader | roll | kneader | roll | kneader |
| Evaluation | Kneading Processability | ○ | ○ | ○ | ○ | ○ | X | X |

Example 1

First Kneading Process

The compounding formulation of the carbon nanotube masterbatch used herein was No. 4. In the first kneading, a carbon nanotube masterbatch containing a fluororubber polymer (CNT content in the masterbatch: 20 wt. %) was produced by roll kneading. As the first kneading equipment, an open roll kneading equipment having a pair of two rolls was used. The roll interval between the first roll and the second roll was set to 1 mm, and the fluororubber polymer and CNT were kneaded to produce a carbon nanotube masterbatch of the formulation No. 4.

The kneading processability when a carbon nanotube masterbatch was produced by kneading with an open roll was evaluated under the following evaluation criteria. The above Table 1 shows the results.

<Evaluation Criteria>

○: Kneadable

X: Not kneadable

Second Kneading Process

The carbon nanotube masterbatch obtained in the first kneading process was kneaded using rolls so that the temperature of the fluororubber polymer was about 80 to 100° C. The roll interval between the first roll and the second roll was set to 1 mm. In the second kneading equipment, the masterbatch No. 4 and the fluororubber raw material shown in Table 2 were kneaded to produce a fluororubber composition.

When a masterbatch and a fluororubber raw material were kneaded in the second kneading equipment, a fluororubber raw material was previously kneaded with a kneader to produce a rubber compound. The previously produced rubber compound was wound around the roll of the second kneading equipment, and the masterbatch was supplied thereto, thereby producing a sufficiently kneaded fluororubber composition.

Crosslinking

Kneading was performed in two steps as the first kneading and the second kneading, followed by crosslinking, thereby producing a crosslinked fluororubber.

Regarding crosslinking, a primary crosslinking was performed by heating at a temperature of about 140 to 230° C. for about 1 to 120 minutes, and a secondary crosslinking was further performed by heat treatment at a temperature of about 200 to 300° C. for about 1 to 20 hours, thereby producing a test piece of the crosslinked fluororubber.

The kneading processability, hardness, abrasion resistance, and blister resistance of the obtained test piece were measured in the following manner and evaluated under the following criteria.

[Kneading Processability]

<Evaluation Criteria>

○: Kneadable

X: Not kneadable

[Hardness]

The rubber hardness Hs (according to JIS K6253 (1997), Duro A (instant)) of the obtained crosslinked sheet having a thickness of 2 mm was measured and evaluated under the following criteria.

<Evaluation Criteria>

○: Duro A of 96 or less

X: Duro A of 97 or more

[Abrasion Resistance]

The test piece was subjected to a taper abrasion test according to JIS K6264. The abrasion conditions were as follows: load: 1 kgf, rotational frequency: 6000 times, and rotational speed: 1 rotation/sec (1 Hz).

Regarding the abrasion resistance, the abrasion volume was determined and evaluated under the following criteria.

<Evaluation Criteria>

○: Abrasion volume of less than 46 mm$^3$

X: Abrasion volume of 46 mm$^3$ or more

[Blister Resistance]

The test piece was dipped in a refrigerant HFC134a and then heated to 50° C. for 1 hour. Then, the presence of foaming from the test piece was visually checked and evaluated under the following criteria.

<Evaluation Criteria>

○: Not foamed

X: Foamed

Examples 2 to 6

In Example 1, the carbon nanotube masterbatch No. 4 or No. 5 was used, and various compounding formulations were used. Then, the kneading processability, hardness, abrasion resistance, and blister resistance were evaluated.

Table 2 below shows the results obtained in the Examples 1 to 6, together with the compounding ratio.

TABLE 2

(Second Kneading Process)

| | | | Ex. 1 | Ex. 2 | Ex. 3 | Ex. 4 | Ex. 5 | Ex. 6 |
|---|---|---|---|---|---|---|---|---|
| Compounding | CNT containing MB | Used masterbatch Compounding No. | 4 | 5 | 4 | 5 | 4 | 5 |
| | | Used masterbatch (parts by weight) | 4 | 4 | 8 | 8 | 50 | 50 |
| | Fluororubber polymer | Viton A-500 (parts by weight) | 97 | 97 | 94 | 94 | 60 | 60 |
| | Wollastonite | (parts by weight) | 30 | 30 | 30 | 30 | 30 | 30 |
| | PTFE | (parts by weight) | 15 | 15 | 15 | 15 | 15 | 15 |
| | Carbon black | SRF (parts by weight) | 6 | 6 | 6 | 6 | 6 | 6 |
| | Magnesium oxide | (parts by weight) | 3 | 3 | 3 | 3 | 3 | 3 |
| | Cross-linking agent | bisphenol AF (parts by weight) | 1.5 | 1.5 | 1.5 | 1.5 | 1.5 | 1.5 |
| | Sum total of parts by weight (parts by weight) | | 156.5 | 156.5 | 157.5 | 157.5 | 165.5 | 165.5 |
| | CNT content in the CNT-containing MB (wt. %) | | 0.8 | 0.8 | 1.6 | 1.6 | 10.0 | 10.0 |
| | CNT content in the rubber composition (wt. %) | | 0.5 | 0.5 | 1.0 | 1.0 | 6.0 | 6.0 |
| | Kneading equipment | | roll | roll | roll | roll | roll | roll |
| Evaluation | Kneading Processability | Evaluation | ○ | ○ | ○ | ○ | ○ | ○ |
| | Hardness | Duro A | 86 | 84 | 87 | 86 | 96 | 96 |
| | | Evaluation | ○ | ○ | ○ | ○ | ○ | ○ |
| | Abrasion resistance | Abrasion volume ($mm^3$) | 37 | 40 | 27 | 30 | 23 | 22 |
| | | Evaluation | ○ | ○ | ○ | ○ | ○ | ○ |
| | Blister resistance | Foamed or Not foamed | Not foamed | Not foamed | Not foamed | Not foamed | Not foamed | Not foamed |
| | | Evaluation | ○ | ○ | ○ | ○ | ○ | ○ |

Comparative Example 1

In Example 1, any carbon nanotube masterbatch was not used; in other words, the first kneading process was omitted, and only the second kneading process was performed. Further, the compounding formulation was changed as shown in Table 3, and the kneading processability, hardness, abrasion resistance, and blister resistance were evaluated.

Comparative Examples 2 to 5

In Example 1 or 2, the compounding formulation was changed as shown in Table 3, and the kneading processability, hardness, abrasion resistance, and blister resistance were evaluated.

Table 3 below shows the results obtained in the Comparative Examples 1 to 5, together with the compounding ratio.

TABLE 3

(Second Kneading Process)

| | | | Comp. Ex. 1 | Comp. Ex. 2 | Comp. Ex. 3 | Comp. Ex. 4 | Comp. Ex. 5 |
|---|---|---|---|---|---|---|---|
| Compounding | CNT-containing MB | Used masterbatch Compounding No. | — | 4 | 5 | 4 | 5 |
| | | Used masterbatch (parts by weight) | 0 | 3 | 3 | 51 | 51 |
| | Fluororubber polymer | Viton A-500 (parts by weight) | 100 | 97.6 | 97.6 | 59.2 | 59.2 |
| | Wollastonite | (parts by weight) | 30 | 30 | 30 | 30 | 30 |
| | PTFE | (parts by weight) | 15 | 15 | 15 | 15 | 15 |
| | Carbon black | SRF (parts by weight) | 6 | 6 | 6 | 6 | 6 |
| | Magnesium oxide | (parts by weight) | 3 | 3 | 3 | 3 | 3 |
| | Cross-linking agent | bisphenol AF (parts by weight) | 1.5 | 1.5 | 1.5 | 1.5 | 1.5 |
| | Sum total of parts by weight (parts by weight) | | 155.5 | 156.1 | 156.1 | 165.7 | 165.7 |
| | CNT content in the CNT-containing MB (wt. %) | | 0.0 | 0.6 | 0.6 | 10.2 | 10.2 |
| | CNT content in the rubber composition (wt. %) | | 0.0 | 0.4 | 0.4 | 6.1 | 6.1 |

TABLE 3-continued (Second Kneading Process)

|  |  |  | Comp. Ex. 1 | Comp. Ex. 2 | Comp. Ex. 3 | Comp. Ex. 4 | Comp. Ex. 5 |
|---|---|---|---|---|---|---|---|
|  | Kneading equipment |  | — | roll | roll | roll | roll |
| Evaluation | Kneading Processability | Evaluation | ○ | ○ | ○ | X | X |
|  | Hardness | Duro A | 80 | 84 | 82 | 97 | 97 |
|  |  | Evaluation | ○ | ○ | ○ | X | X |
|  | Abrasion resistance | Abrasion volume (mm³) | 48 | 40 | 41 | 23 | 22 |
|  |  | Evaluation | × | ○ | ○ | ○ | ○ |
|  | Blister resistance | Foamed or Not foamed | Foamed | Foamed | Foamed | Not foamed | Not foamed |
|  |  | Evaluation | × | × | × | ○ | ○ |

Test 2

Test 2 of this Example was carried out by replacing the roll kneading of the second kneading process in above Test 1 with kneader kneading. Also in Test 2, kneading was performed in two steps as a first kneading and a second kneading, followed by crosslinking, thereby producing a crosslinked fluororubber, as in Test 1. In the first kneading, a carbon nanotube masterbatch containing a fluororubber polymer was produced by roll kneading or kneader kneading. The masterbatch and a fluororubber raw material were introduced into a second kneading equipment of a kneader kneading equipment to produce a fluororubber composition. That is, the first kneading is the same as that of Test 1, but the method of the second kneading is different from that of Test 1.

Example 7

In Example 1, a fluororubber composition was produced in the same manner as in Example 1, except that "2. Second Kneading Process" was changed in the following manner. The kneading processability, hardness, abrasion resistance, and blister resistance of the obtained fluororubber composition were evaluated.

"Second Kneading Process

The carbon nanotube masterbatch obtained in the first kneading process was introduced into a second kneading equipment, which was a kneader kneading equipment.

In the second kneading equipment, the masterbatch No. 4 and a fluororubber raw material of the following formulation were kneaded to produce a fluororubber composition."

Examples 8 to 12

In Example 7, the carbon nanotube masterbatch No. 4 or No. 5 was used, and various compounding formulations were used. Then, the kneading processability, hardness, abrasion resistance, and blister resistance were evaluated. Table 4 shows the results.

Table 4 below shows the results obtained in the above Examples 7 to 12, together with the compounding ratio.

TABLE 4

(Second Kneading Process)

|  |  |  | Ex. 7 | Ex. 8 | Ex. 9 | Ex. 10 | Ex. 11 | Ex. 12 |
|---|---|---|---|---|---|---|---|---|
| Compounding | CNT-containing MB | Used masterbatch Compounding No. | 4 | 5 | 4 | 5 | 4 | 5 |
|  |  | Used masterbatch (parts by weight) | 4 | 4 | 8 | 8 | 50 | 50 |
|  | Fluororubber polymer | Viton A-500 (parts by weight) | 97 | 97 | 94 | 94 | 60 | 60 |
|  | Wollastonite | (parts by weight) | 30 | 30 | 30 | 30 | 30 | 30 |
|  | PTFE | (parts by weight) | 15 | 15 | 15 | 15 | 15 | 15 |
|  | Carbon black | SRF (parts by weight) | 6 | 6 | 6 | 6 | 6 | 6 |
|  | Magnesium oxide | (parts by weight) | 3 | 3 | 3 | 3 | 3 | 3 |
|  | Cross-linking agent | bisphenol AF (parts by weight) | 1.5 | 1.5 | 1.5 | 1.5 | 1.5 | 1.5 |
|  | Sum total of parts by weight (parts by weight) |  | 156.5 | 156.5 | 157.5 | 157.5 | 165.5 | 165.5 |
|  | CNT content in the CNT-containing MB (wt. %) |  | 0.8 | 0.8 | 1.6 | 1.6 | 10.0 | 10.0 |
|  | CNT content in the rubber composition (wt. %) |  | 0.5 | 0.5 | 1.0 | 1.0 | 6.0 | 6.0 |
|  | Kneading equipment |  | kneader | kneader | kneader | kneader | kneader | kneader |
| Evaluation | Kneading Processability | Evaluation | ○ | ○ | ○ | ○ | ○ | ○ |
|  | Hardness | Duro A | 86 | 84 | 87 | 86 | 96 | 96 |
|  |  | Evaluation | ○ | ○ | ○ | ○ | ○ | ○ |

TABLE 4-continued (Second Kneading Process)

|  |  | Ex. 7 | Ex. 8 | Ex. 9 | Ex. 10 | Ex. 11 | Ex. 12 |
|---|---|---|---|---|---|---|---|
| Abrasion resistance | Abrasion volume (mm³) | 35 | 38 | 26 | 28 | 22 | 20 |
|  | Evaluation | ○ | ○ | ○ | ○ | ○ | ○ |
| Blister resistance | Foamed or Not foamed | Not foamed | Not foamed | Not foamed | Not foamed | Not foamed | Not foamed |
|  | Evaluation | ○ | ○ | ○ | ○ | ○ | ○ |

Comparative Examples 6 to 9

In Example 7 or 8, the compounding formulation was changed as shown in Table 5, and the kneading processability, hardness, abrasion resistance, and blister resistance were evaluated.

Table 5 below shows the results obtained in the above Comparative Examples 6 to 9, together with the compounding ratio.

TABLE 5

(Second Kneading Process)

|  |  |  | Comp. Ex. 6 | Comp. Ex. 7 | Comp. Ex. 8 | Comp. Ex. 9 |
|---|---|---|---|---|---|---|
| Compounding | CNT-containing MB | Used masterbatch Compounding No. | 4 | 5 | 4 | 5 |
|  |  | Used masterbatch (parts by weight) | 3 | 3 | 51 | 51 |
|  | Fluororubber polymer | Viton A-500 (parts by weight) | 97.6 | 97.6 | 59.2 | 59.2 |
|  | Wollastonite | (parts by weight) | 30 | 30 | 30 | 30 |
|  | PTFE | (parts by weight) | 15 | 15 | 15 | 15 |
|  | Carbon black | SRF (parts by weight) | 6 | 6 | 6 | 6 |
|  | Magnesium oxide | (parts by weight) | 3 | 3 | 3 | 3 |
|  | Cross-linking agent | bisphenol AF (parts by weight) | 1.5 | 1.5 | 1.5 | 1.5 |
|  | Sum total of parts by weight (parts by weight) |  | 156.1 | 156.1 | 165.7 | 165.7 |
|  | CNT content in the CNT-containing MB (wt. %) |  | 0.6 | 0.6 | 10.2 | 10.2 |
|  | CNT content in the rubber composition (wt. %) |  | 0.4 | 0.4 | 6.1 | 6.1 |
|  | Kneading equipment |  | kneader | kneader | kneader | kneader |
| Evaluation | Kneading Processability | Evaluation | ○ | ○ | × | × |
|  | Hardness | Duro A | 85 | 82 | 97 | 97 |
|  |  | Evaluation | O | O | X | X |
|  | Abrasion resistance | Abrasion volume (mm³) | 38 | 38 | 20 | 20 |
|  |  | Evaluation | ○ | ○ | ○ | ○ |
|  | Blister resistance | Foamed or Not foamed | Foamed | Foamed | Not foamed | Not foamed |
|  |  | Evaluation | × | × | ○ | ○ |

The above results demonstrate the following:

(1) According to Table 1, regarding the formulation Nos. 1, 2, and 4, the CNT content in the masterbatch was 4 to 20 wt. %, and kneading was performed using a roll kneading equipment; they all had excellent kneading processability. Moreover, regarding the formulation Nos. 3 and 5, the CNT content in the masterbatch was 4 to 20 wt. %, and kneading was performed using a kneader kneading equipment; they both had excellent kneading processability.

Regarding the formulation Nos. 6 and 7 of Comparative Examples, the CNT content in each masterbatch was 21 wt. %, and each kneading was performed using a roll kneading equipment or a kneader kneading equipment; however, their kneading processability was inferior.

(2) As shown in Examples 1 to 12 of Tables 2 and 4, when the CNT content in the fluororubber composition was 0.5 to 6.0 wt. % at the time of performing the first kneading and the second kneading, the hardness, abrasion resistance, and blister resistance were excellent.

(3) As shown in Comparative Examples 1 to 9 of Tables 3 and 5, when the CNT content in the fluororubber composition was outside of the range of 0.5 to 6.0 wt. % at the time of performing the first kneading and the second kneading, either the hardness, abrasion resistance, or blister resistance was inferior.

In particular, when the CNT content in the fluororubber composition was less than 0.5 wt. %, the blister resistance was inferior, as shown in Comparative Examples 1 to 3, 6, and 7. When the CNT content in the fluororubber composition was 6.1 wt. % or more, the hardness and kneading processability were inferior, as shown in Comparative Examples 4, 5, 8 and 9.

(4) Although Comparative Example 1 is an example of one-step kneading, in the present invention, CNT is more loosened by two-step kneading, and dispersibility is consequently improved. By one-step kneading using a roll, the rubber compound surface was rough, and was not a normal rubber surface.

The invention claimed is:

1. A method for producing a fluororubber composition that is formulated and compounded to form crosslinked molded sealing materials that are resistant to abrasion and blistering which method comprises:
   providing kneaded masterbatch comprising 4 to 20 parts by weight of multilayer carbon nanotubes, which are fibrous carbon nanostructures that do not contain monolayer carbon nanotubes, based on 100 parts by weight of a fluororubber polymer;
   providing a fluororubber raw material comprising at least a fluororubber polymer and a reinforcing filler; and
   kneading the masterbatch and the fluororubber material together to form a kneaded fluororubber composition in which the multilayer carbon nanotubes are compounded in an amount of 0.5 to 6 wt. %, wherein kneading is performed using a roll or a kneader.

2. The method for producing a fluororubber composition according to claim 1, wherein an open roll having a pair of rolls, which are arranged at 0.7 to 1.5 mm roll interval, is used.

3. The method for producing a fluororubber composition according to claim 2, wherein kneading is performed using a roll at a temperature of 60 to 100° C. or using a kneader at a temperature of 100 to 200° C.

4. The method for producing a fluororubber composition according to claim 1, wherein as the fluororubber raw material, one being previously formed as a rubber compound using a kneader is used.

5. The method for producing a fluororubber composition according to claim 4, wherein kneading is performed using a roll at a temperature of 60 to 100° C. or using a kneader at a temperature of 100 to 200° C.

6. The method for producing a fluororubber composition according to claim 1, wherein kneading is performed using a roll at a temperature of 60 to 100° C. or using a kneader at a temperature of 100 to 200° C.

7. The method for producing a fluororubber composition according to claim 1, wherein the reinforcing filler comprises carbon black.

* * * * *